United States Patent
Zhu et al.

(10) Patent No.: US 11,625,077 B2
(45) Date of Patent: Apr. 11, 2023

(54) SOLID-STATE HARD DISK PLUG-IN DEVICE

(71) Applicants: Inventec (Pudong) Technology Corporation, Shanghai (CN); INVENTEC CORPORATION, Taipei (TW)

(72) Inventors: Hui Zhu, Shanghai (CN); Jiaqi Yuan, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/356,522

(22) Filed: Jun. 24, 2021

(65) Prior Publication Data
US 2022/0300046 A1 Sep. 22, 2022

(30) Foreign Application Priority Data
Mar. 16, 2021 (CN) .......................... 202110281342.5

(51) Int. Cl.
*G06F 1/18* (2006.01)
*H01R 13/629* (2006.01)

(52) U.S. Cl.
CPC ....... *G06F 1/187* (2013.01); *H01R 13/62961* (2013.01)

(58) Field of Classification Search
CPC ...... G06F 1/187; G11B 33/123; G11B 33/124
See application file for complete search history.

(56) References Cited

U.S. PATENT DOCUMENTS

| | | | |
|---|---|---|---|
| 10,056,118 B2 * | 8/2018 | Lu ......................... | G11B 33/124 |
| 10,228,734 B1 * | 3/2019 | Hsieh ................... | G11B 33/124 |
| 2002/0101708 A1 * | 8/2002 | Cheng ................. | G11B 33/124 |

* cited by examiner

*Primary Examiner* — James Wu

(57) ABSTRACT

The present invention provides a solid-state hard disk lug-in device, including: a main body; a solid-state hard disk installation slot arranged on one side of the main body; and plug-in components. The plug-in components include an operating switch and an operating handle. When the operating switch is closed, the operating handle is restricted to a closed position, and when the operating switch is open, the operating handle is released to an extended position; when the operating handle in the closed position is pushed by an external force, the solid-state hard disk can be inserted into the hard disk slot of the solid-state hard disk system; when the operating handle in the extended position is pulled by an external force, the solid-state hard disk can be pulled out of the hard disk slot.

7 Claims, 4 Drawing Sheets

| Item | TYPE | POWER(W) | PITCH | SIZE | Description | Picture | ProE_Name |
|---|---|---|---|---|---|---|---|
| E1.S | 5.9mm device | 12 | 9 | 111.49x31.5 | Thickness 5.9 mm, 1C (PCIE LANE 4X) | 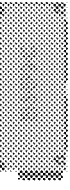 | E1-S-5P9-1C.asm |
| E1.S | device with heat spreader | 16 | 11 | 111.49x31.5 | Thickness 8.01 mm, 1C (PCIE LANE 4X) |  | E1-S-8P01-1C.asm |
| E1.S | device with symmetric enclosure | 20 | 13 | 118.75x33.75 | Thickness 9.5 mm, 2C (PCIE LANE 8X) |  | E1-S-9P5-2C.asm |
| E1.S | device with Asymmetric enclosure | 20 | 17 | 118.75x33.75 | Thickness 15 mm, 2C (PCIE LANE 8X) |  | E1-S-15-2C.asm |
| E1.S | device with Asymmetric enclosure | 25 | 28 | 118.75x33.75 | Thickness 25 mm, 2C (PCIE LANE 8X) |  | E1-S-25-2C.asm |
| E1.L | 9.5mm thick device | 25 | 12.5 | 318.75x38.4 | Thickness 9.5 mm, 2C (PCIE LANE 8X) |  | E1-L-9P5-2C.asm |
| E1.L | 18mm thick device | 25(low fan) 40 (high fan) | 19 | 318.75x38.4 | Thickness 18 mm, 2C (PCIE LANE 8X) |  | E1-L-18-2C.asm |

Fig. 2

SOLID-STATE HARD DISK PLUG-IN DEVICE

CROSS REFERENCE TO RELATED APPLICATION

The present application claims the benefit of priority to Chinese Patent Application No. CN 2021102813425, entitled "SOLID-STATE HARD DISK PLUG-IN DEVICE", filed with CNIPA on Mar. 16, 2021, the disclosure of which is incorporated herein by reference in its entirety.

FIELD OF TECHNOLOGY

The present disclosure generally relates to the field of computer technology, in particular to a solid-state hard disk plug-in device.

BACKGROUND

Enterprise and Datacenter 1U short SSD (E1.S) and Enterprise and Datacenter 1U long SSD (E1.L) as two types of new solid state disks (SSD) are widely used because of their compact sizes and they are favored by the majority of customers.

Solid-state hard disks are bare boards similar to M.2 solid-state drives. There is currently no plug-in device specifically for them, which is not conducive to realizing the efficient and convenient plug operation of this kind of solid state drives.

SUMMARY

The present invention provides a solid-state hard disk plug-in device, including: a main body; a solid-state hard disk installation slot arranged on one side of the main body; and plug-in components. The plug-in components include an operating switch and an operating handle. When the operating switch is closed, the operating handle is restricted to a closed position, and when the operating switch is open, the operating handle is released to an extended position; when the operating handle in the closed position is pushed by an external force, the solid-state hard disk is inserted into the hard disk slot of the solid-state hard disk system; when the operating handle in the extended position is pulled by an external force, the solid-state hard disk is pulled out of the hard disk slot.

BRIEF DESCRIPTION OF THE DRAWINGS

FIG. 2 shows a schematic diagram of types of solid-state drives according to an embodiment of the present disclosure.

DETAILED DESCRIPTION

One or more specific embodiments of the present disclosure will be described below. These described embodiments are only examples of the presently disclosed techniques, and are not intended to limit aspects of the presently disclosed invention. Additionally, in an effort to provide a concise description of these embodiments, all features of an actual implementation may not be described in the specification. It should be appreciated that in the development of any such actual implementation, numerous implementation-specific decisions must be made to achieve the developers' specific goals, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terms regarding spatial relationships such as "lower," "below," "under," and "on," "above," etc., are used for convenience of description to describe the relationship of one element or feature to another element or feature in a figure. It should be understood that in addition to the orientation shown in the figure, the spatial relationship terms are intended to include different orientations during use and operation. For example, if the device in the figures is rotated, then what is described as "below" or "beneath" or "under" may become "on" or "above" or "over." Thus, the term "below" and "under" may include both upper and lower orientations. Device may additionally be oriented differently (e.g., rotated 90 degrees or other orientations), and the spatial relationship used in this description are interpreted accordingly.

Figure 1:
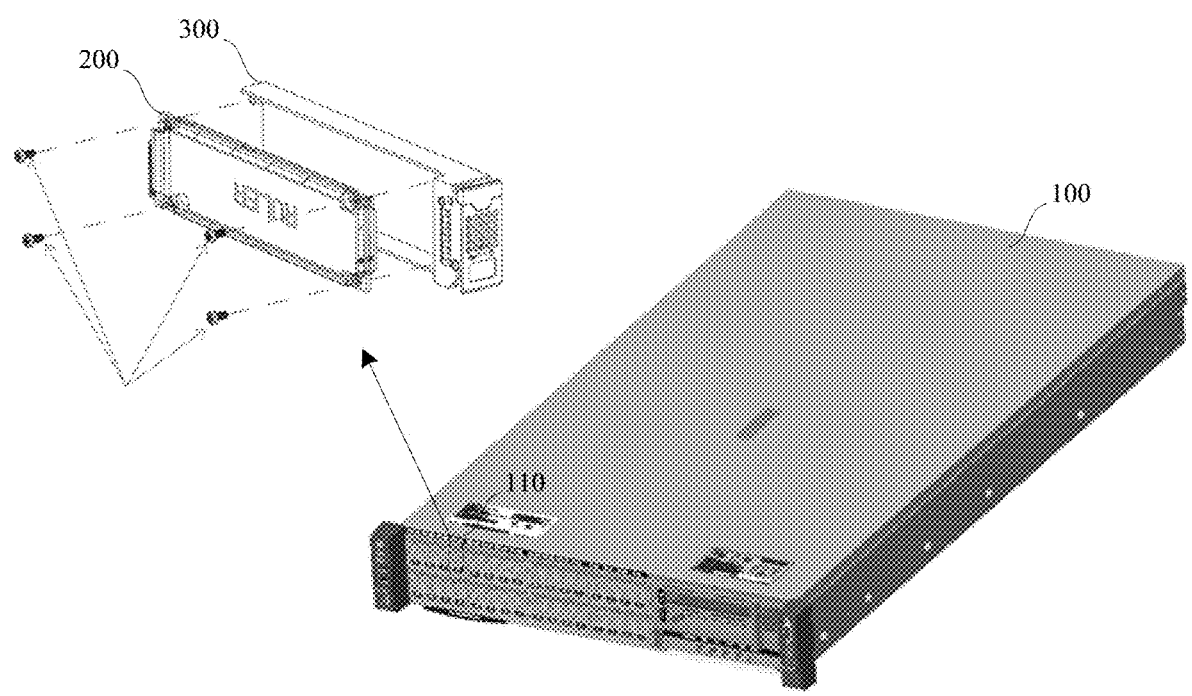
FIG. 1 shows a schematic diagram of the structure of a solid-state hard disk system according to an embodiment of the present disclosure.

Please refer to FIG. 1. In a solid-state hard disk system 100 shown in FIG. 1, a plurality of solid-state hard disk modules 110 is arranged in an orderly manner. Each of the solid-state hard disk modules 110 includes a solid-state hard disk 200 and a solid-state hard disk plug-in device 300 proposed by this disclosure. The solid-state hard disk plug-in device 300 is used to load the solid-state hard disk 200, and install the solid-state hard disk 200 in the solid-state hard disk system 100. Specifically, the solid-state hard disk 200 of the present disclosure can be either E1.S or E1.L. The solid-state hard disk 200 can also be of other types. Some of the types are shown in FIG. 2.

The solid-state hard disk plug-in device 300 of the present disclosure will be described in detail below in conjunction with FIGS. 3 to 6.

The solid-state hard disk plug-in device 300 in one embodiment includes: a main body 310, a base 312, and plug-in components 320.

Figure 3:
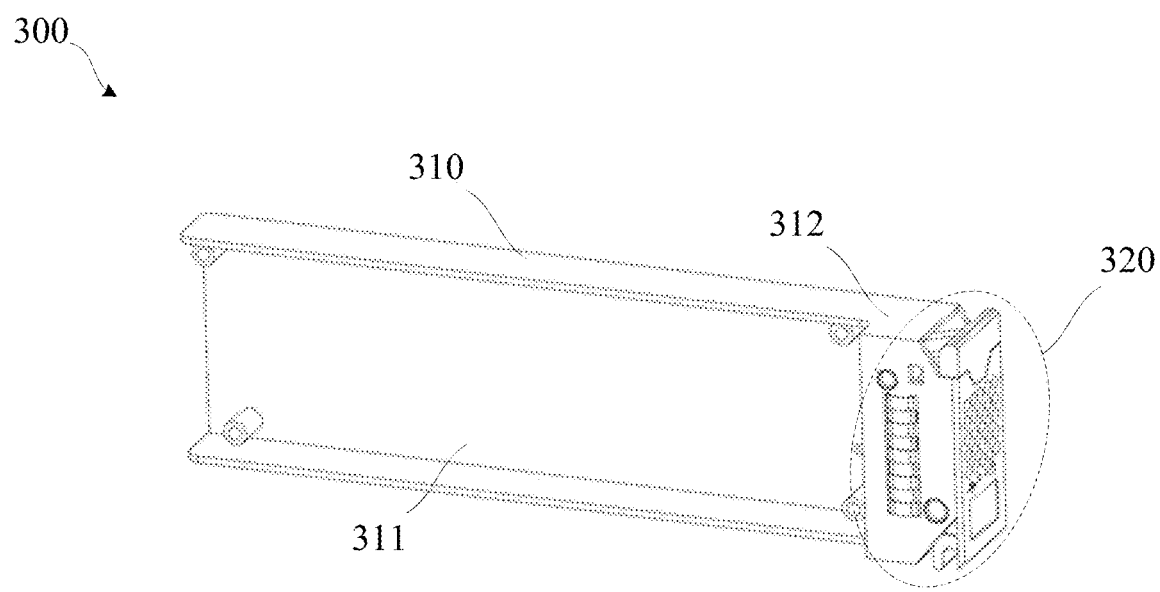
FIG. 3 is a schematic diagram of the structure of a solid-state hard disk plug-in device according to an embodiment of the present disclosure.

Referring to FIG. 3, a solid-state hard disk installation slot 311 is formed on one side of the main body 310 for loading the solid-state hard disk 200. Solid-state hard disk installation posts 3111 (boss posts) can be arranged in the four corners of the solid-state hard disk installation slot 311, so that the solid-state hard disk 200 can be fixed to the solid-state hard disk installation slot 311. One end of the solid-state hard disk installation slot 311 is an opening (see the left side of FIG. 3), which is used to expose the interface end (e.g., golden finger) of the solid-state hard disk 200. The other end of the solid-state hard disk installation slot 311

(see the right end of FIG. 3) is connected with the base 312 for installing the plug-in components 320 of the solid-state hard disk 200.

The base 312 includes a bottom surface 3124, which is perpendicular to the length direction of the solid-state hard disk installation slot 311. Referring to FIG. 5, the base 312 further includes two side surfaces 3121, and the two side surfaces 3121 are parallel to each other and perpendicular to the bottom surface 3124. In one embodiment, referring to FIG. 4, the two side surfaces 3121 of the base 312 are respectively provided with longitudinal electromagnetic interference spring installation slots 3122, and the upper portions of each side surface 3121 are respectively provided with windows 3123.

The plug-in component 320 includes an operating switch 321 and an operating handle 322. When the operating switch 321 is closed, the operating handle 322 is restricted to a closed position, and when the operating switch 321 is open, the operating handle 322 is released to an extended position; when the operating handle 322 in the closed position is pushed by an external force, the solid-state hard disk 200 can be inserted into the hard disk slot of the solid-state hard disk system 100; when the operating handle 322 in the extended position is pulled by an external force, the solid-state hard disk 200 can be pulled out of the hard disk slot.

Specifically, the operating switch 321 includes an operating portion 3212 and two side walls 3213 vertically fixed to the back of the operating portion 3212, and the end of each side wall 3213 is provided with a first mounting hole. The plug-in components 320 further include: a first torsion spring 323 located between the two side walls 3213. A first positioning post 325 extends through the first mounting holes of the two side walls 3213 and the first torsion spring 323 at the same time, and the two ends of the first positioning post 325 are respectively fixed on the two side surfaces 3121 of the base 312, so that the first torsion spring 323 is connected between the operating switch 321 and the bottom surface of the base 312, that is, one end of the first torsion spring 323 abuts against the back surface of the operating portion 3212 of the operating switch 321, and the other end abuts against the bottom surface of the base 312.

When the operating switch 321 is in a default closed state, the first torsion spring 323 is stretched and deformed under the action of the operating switch 321 and the bottom surface of the base 312, and the operating switch 321 is closed due to the retraction force of the first torsion spring 323. Referring to step ① of FIG. 5, when the user flips up the bottom end of the "T"-shaped operating portion, the operating switch 321 is in an open state, and the first torsion spring 323 is stretched and deformed after receiving an external force. Referring to step ② in FIG. 5, the operating switch 321 is open, and the operating handle 322 is released immediately to an extended position at the same time. It should be noted that the present disclosure does not limit the shape of the operating portion 3212, and the shape of the lower edge of the operating portion 3212 should match the shape of the upper edge of the operating handle 322.

In one embodiment, referring to FIG. 5, the two side walls 3213 of the operating switch 321 are respectively provided with protrusions 3211, each of the windows 3123 on the side surfaces 3121 of base 312 correspond to one of the protrusions 3211, that is, each of the protrusions 3211 extends into the corresponding window 3123, and the window 3123 is configured to limit the movement range of the corresponding protrusion 3211, thereby limiting the opening position of the operating switch 321, and avoiding the excessive opening and closing movement of the operating switch 321.

Figure 6:
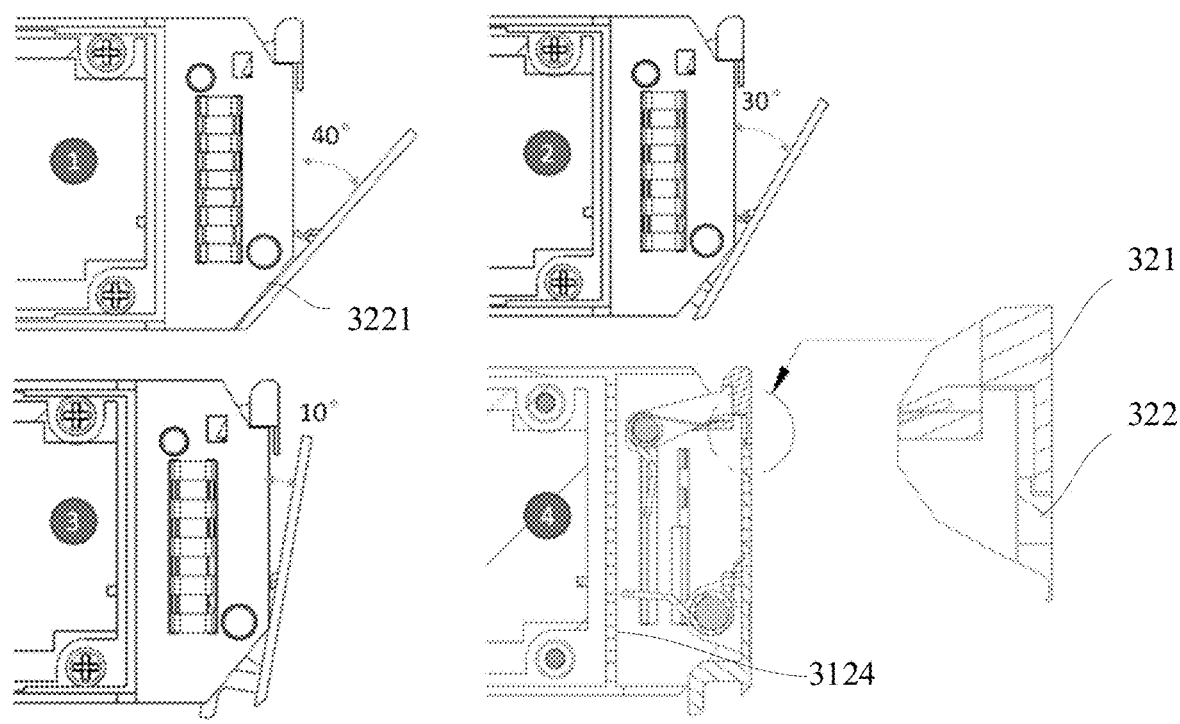
FIG. 6 is a schematic diagram showing the closing process and partial structure of a solid-state hard disk plug-in device according to an embodiment of the present disclosure.

Referring to FIG. 6, the upper end of the operating handle 322 is provided with a concave portion, the operating switch 321 is made of elastic material, and the lower end of the operating switch is provided with a convex portion matching the concave portion of the operating handle 322. In the closed state, the lower end of the operating switch 321 is engaged with the convex portion of the operating handle 322. When the user presses the top of the operating switch 321 in the vertical direction, under the action of the elastic material, the lower end of the operating switch 321 is separated from the convex portion of the operating handle 322, thereby exposing the lower end of the operating switch 321 for the user to flip upward.

Figure 4:
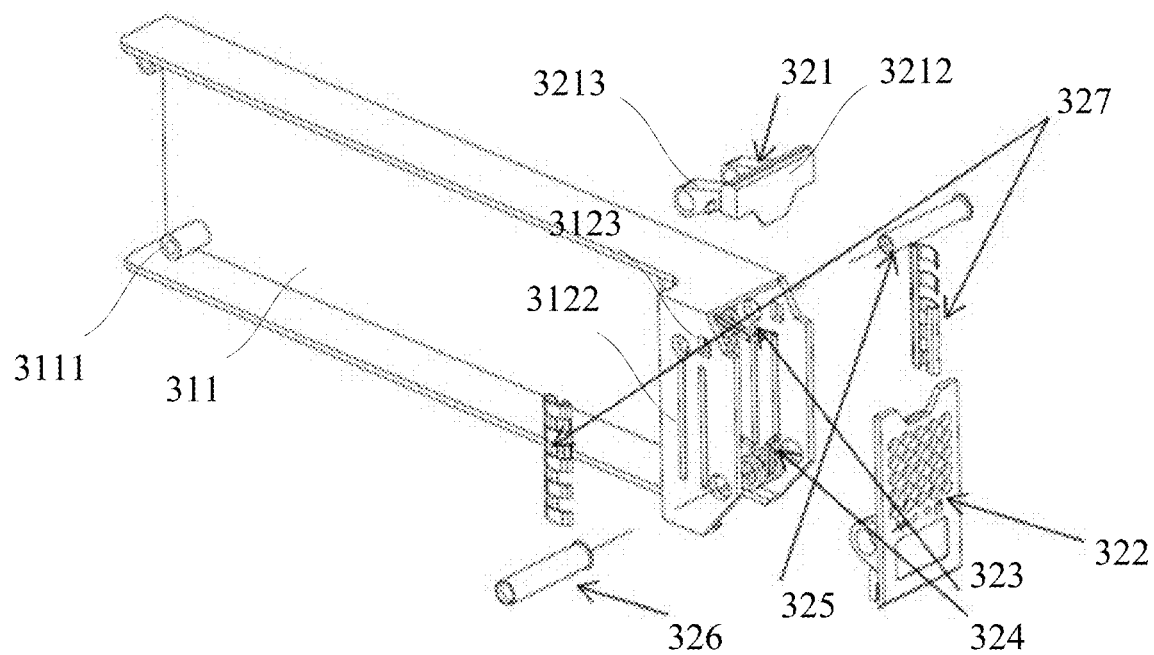
FIG. 4 shows an exploded view of the solid state hard disk plug-in device shown in FIG. 3.
Figure 5:
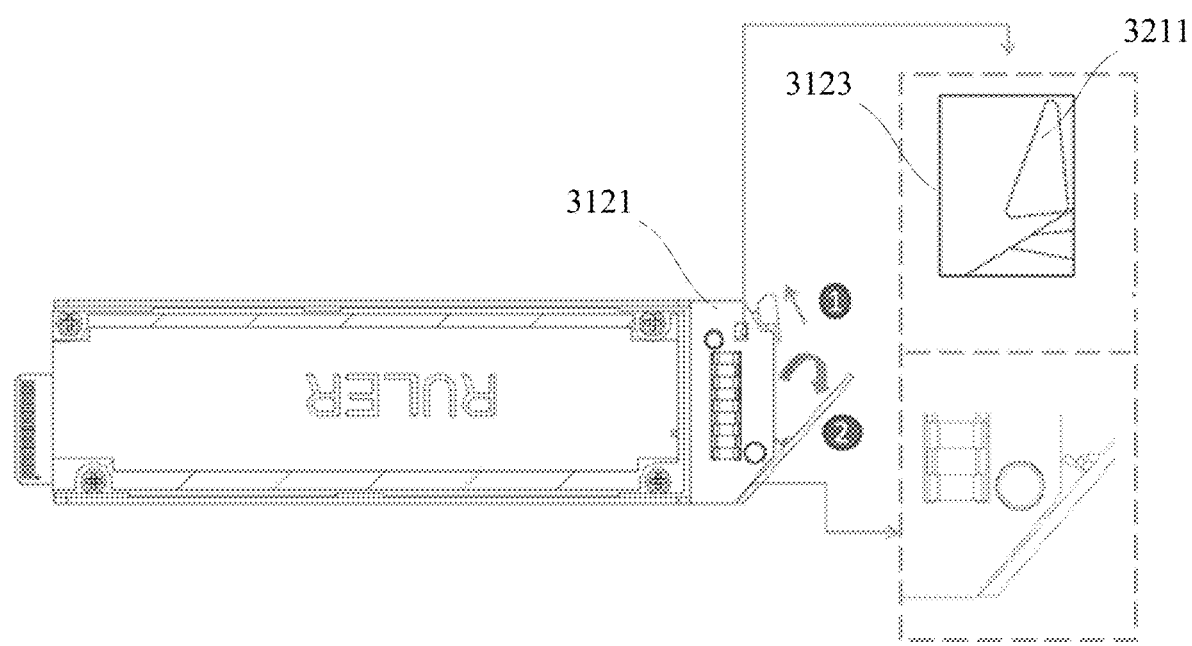
FIG. 5 is a schematic diagram showing the opening process and partial structure of a solid-state hard disk plug-in device according to an embodiment of the present disclosure.

Referring to FIG. 4, the operating handle 322 is provided with an array of vents, below which is a label area, and indicator screens, disc sequence labels, indicator lights, etc. can also be arranged below the vents. One or two second mounting holes are provided on the inner side of the operating handle 322. The plug-in components 320 also includes: a second torsion spring 324, and a second positioning post 326 extending through the second mounting holes and the second torsion spring 324 located between the second mounting holes. Two ends of the second positioning post 326 are respectively fixed to the two side surfaces 3121 of the base 312 so that the second torsion spring 324 is connected between the operating handle 322 and the bottom surface of the base 312. Compression deformation of the second torsion spring 324 is caused by force exerted by the bottom surface of the base 312 and the operating handle 322 in the closed position. After the operating switch 321 is opened, the second torsion spring 324 recovers from deformation, so that the operating handle 322 is released to the extended position.

FIG. 6, including steps ①~④ is a schematic diagram showing the closing process the solid-state hard disk plug-in device according to an embodiment of the present disclosure. The user gradually pushes the operating handle 322 to the vertical position, and buckles the upper end of the operating handle 322 with the lower end of the operating switch 321, thereby realizing the closing of the solid-state hard disk plug-in device.

In one embodiment, referring to FIG. 6, the width of the operating handle 321 is the same as the width of the base 312, and the two side surfaces 3121 of the base 312 are respectively provided with chamfers 3221 to limit the opening position of the operating handle 322, in order to avoid excessive opening and closing movement of the operating handle 322.

In one embodiment, an inverted L-shaped chassis hard disk module side wall opening is provided below the operating handle 322, and it is configured to adapt to the shape of an external hard disk chassis module.

In one embodiment, referring to FIGS. 4-6, plug-in components 320 further include: two electromagnetic interference springs 327, respectively installed in the electromagnetic interference spring installation slot 3122, to contact with the metal parts of the external chassis to eliminate electromagnetic interference.

In summary, the plug-in device of the solid-state hard disk of the present invention can realize convenient plug-in operation while protecting the solid-state hard disk. The user can release the operating handle by turning the operating switch with one hand. The solid-state hard disk can be pulled out from the hard disk slot of the system by directly pulling the handle; the plug-in device of the solid-state hard disk of the present disclosure is relatively small, which makes it compatible with the height requirements of E1.S and E1.L.

The entire device is formed through die-casting and therefore no shock-proof design is required. Thus the plug-in device of the solid-state hard disk of the present disclosure effectively overcomes various shortcomings in the prior art and has a high industrial value.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A solid-state hard disk plug-in device, comprising:
   a main body, wherein a solid-state hard disk installation slot is arranged on one side of the main body, and one end of the solid-state hard disk installation slot is an opening to expose an interface end of a solid-state hard disk;
   a base, connected to the other end of the solid-state hard disk installation slot; and
   plug-in components, arranged on the base,
   wherein the plug-in components comprise an operating switch and an operating handle, wherein
      when the operating switch is closed, the operating handle is restricted to a closed position,
      when the operating switch is open, the operating handle is released to an extended position,
      when the operating handle in the closed position is pushed by a first external force, the solid-state hard disk is inserted into a hard disk slot of a solid-state hard disk system, and
      when the operating handle in the extended position is pulled by a second external force, the solid-state hard disk is pulled out of the hard disk slot,
   wherein the base comprises a bottom surface perpendicular to a length direction of the solid-state hard disk installation slot,
   wherein the plug-in components further comprise a first torsion spring connected between the operating switch and the bottom surface, and the first torsion spring generates tensile deformation under an action of the operating switch and the bottom surface,
   wherein the operating switch is in a closed state under an action of a retraction force of the first torsion spring, and is in an open state when a third external force increases an amount of tensile deformation of the first torsion spring,
   wherein two side walls of the operating switch are respectively provided with protrusions,
   wherein the base further includes two side surfaces respectively perpendicular to the bottom surface; wherein each of the side surfaces is provided with a window at a position corresponding to one of the protrusions, each protrusion is located in its corresponding window, and the windows are used to limit a range of motion of the protrusions, thereby limiting an open position of the operating switch.

2. The solid-state hard disk plug-in device according to claim 1, wherein the two side walls of the operating switch are respectively provided with first mounting holes,
   wherein the plug-in components further include a first positioning post, which extends through each of the first mounting holes and the first torsion spring located between the first mounting holes, and both ends of the first positioning post are respectively fixed to the two side surfaces of the base.

3. The solid-state hard disk plug-in device according to claim 1, wherein an upper end of the operating handle is provided with a concave portion,
   wherein the operating switch is made of elastic material, and a lower end of the operating switch is provided with a convex portion matching the concave portion.

4. The solid-state hard disk plug-in device according to claim 1, wherein the plug-in components further comprise a second torsion spring, wherein
   the second torsion spring is connected between the operating handle and the bottom surface, and produces compression deformation under an action of the bottom surface and the operating handle in the closed position,
   when the operating switch is in the open state, the second torsion spring recovers from the deformation, so that the operating handle is released to the extended position.

5. The solid-state hard disk plug-in device according to claim 4, wherein a width of the operating handle is the same as a width of the base, and chamfers are provided below the two side surfaces of the base respectively to limit an open position of the operating handle.

6. The solid-state hard disk plug-in device according to claim 4, wherein an inner side of the operating handle is provided with two second mounting holes,
   wherein the plug-in components further include a second positioning post,
   wherein the second positioning post penetrates each of the second mounting holes and the second torsion spring located between the second mounting holes, and both ends of the second positioning post are respectively fixed to the two sides surfaces of the base.

7. The solid-state hard disk plug-in device according to claim 1, wherein the two sides surfaces of the base are respectively provided with electromagnetic interference spring installation slots,
   wherein the plug-in components further comprise two electromagnetic interference springs, that are respectively installed in the electromagnetic interference spring installation slots and are in contact with metal parts of an external hard disk chassis to eliminate electromagnetic interference.

* * * * *